(12) United States Patent
Nishimura et al.

(10) Patent No.: US 7,810,610 B2
(45) Date of Patent: Oct. 12, 2010

(54) EXHAUST DEVICE INCLUDING ELASTICALLY DEFORMABLE ANNULAR MEMBER AND VEHICLE WITH EXHAUST DEVICE

(75) Inventors: Hidehiro Nishimura, Shizuoka-ken (JP); Hiromi Suzuki, Shizuoka-ken (JP); Manabu Shimoishi, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 129 days.

(21) Appl. No.: 11/743,046

(22) Filed: May 1, 2007

(65) Prior Publication Data
US 2007/0261907 A1 Nov. 15, 2007

(30) Foreign Application Priority Data
May 1, 2006 (JP) .............................. 2006-127218

(51) Int. Cl.
*F01N 1/02* (2006.01)
(52) U.S. Cl. .................... 181/251; 181/227; 181/228; 180/296
(58) Field of Classification Search ................. 181/251, 181/227, 228; 180/296
See application file for complete search history.

(56) References Cited

U.S. PATENT DOCUMENTS

| | | | | |
|---|---|---|---|---|
| 1,038,931 A * | 9/1912 | Michaelson | ................. | 181/228 |
| 1,302,300 A * | 4/1919 | Brinkman | ................... | 181/279 |
| 2,229,578 A * | 1/1941 | Malpas | ........................ | 277/473 |
| 2,770,313 A * | 11/1956 | Johnson | ...................... | 181/227 |
| 3,276,540 A * | 10/1966 | Crouse | ........................ | 181/227 |
| 3,323,785 A * | 6/1967 | Mather | ........................ | 267/167 |
| 3,323,807 A * | 6/1967 | Vanderbilt, Jr. | ............. | 277/481 |
| 3,511,617 A * | 5/1970 | Lyben | ......................... | 422/171 |
| 3,648,802 A * | 3/1972 | Pierce | ......................... | 181/227 |
| 3,903,928 A * | 9/1975 | Sykes et al. | ................. | 138/109 |
| 4,310,068 A * | 1/1982 | Erskine | ....................... | 181/290 |
| 4,315,558 A * | 2/1982 | Katayama | .................... | 181/227 |
| 4,437,292 A * | 3/1984 | Buri et al. | ..................... | 53/357 |
| 4,540,064 A * | 9/1985 | Fujimura | .................... | 181/227 |
| 4,854,416 A * | 8/1989 | Lalikos et al. | ............... | 181/207 |
| 4,993,512 A * | 2/1991 | Lescher | ...................... | 181/227 |
| 5,198,625 A * | 3/1993 | Borla | .......................... | 181/248 |
| 5,248,859 A * | 9/1993 | Borla | .......................... | 181/238 |
| 5,392,602 A * | 2/1995 | Matsumoto | .................. | 60/299 |
| 5,556,679 A * | 9/1996 | Booles | ..................... | 428/36.91 |
| 5,831,223 A * | 11/1998 | Kesselring | ................... | 181/227 |
| 5,901,754 A * | 5/1999 | Elsasser et al. | ............. | 138/118 |

(Continued)

FOREIGN PATENT DOCUMENTS

DE   4243115 A1 *   7/1993

(Continued)

*Primary Examiner*—Jeffrey Donels
*Assistant Examiner*—Forrest M Phillips
(74) *Attorney, Agent, or Firm*—Keating & Bennett, LLP

(57) ABSTRACT

A muffler for a vehicle, such as a scooter type motorcycle, comprises an inner tubular member and an outer tubular member. An inner surface of the outer tubular member faces an outer surface of the inner tubular member. A ring shaped or annular member is positioned between the outer surface of the inner tubular member and the inner surface of the outer tubular member. The annular member has a substantially hollow cross section and is elastically deformable in a direction perpendicular to a longitudinal axis of the inner tubular member and the outer tubular member.

20 Claims, 14 Drawing Sheets

U.S. PATENT DOCUMENTS

| | | | |
|---|---|---|---|
| 6,062,268 A * | 5/2000 | Elsasser et al. | 138/121 |
| 6,070,695 A * | 6/2000 | Ohtaka et al. | 181/282 |
| 6,105,716 A * | 8/2000 | Morehead et al. | 181/255 |
| 6,260,652 B1 * | 7/2001 | Steenackers et al. | 180/296 |
| 6,273,688 B1 * | 8/2001 | Kawahara et al. | 417/417 |
| 6,408,980 B1 * | 6/2002 | Dooley | 181/228 |
| 6,508,635 B2 * | 1/2003 | Kueon | 417/312 |
| 6,543,575 B1 * | 4/2003 | Marcellus | 181/224 |
| 6,715,581 B2 * | 4/2004 | Dooley | 181/228 |
| 6,939,206 B2 * | 9/2005 | Ashjaee et al. | 451/41 |
| 7,007,720 B1 * | 3/2006 | Chase et al. | 138/110 |
| 7,370,670 B1 * | 5/2008 | Bruckbauer | 137/614.11 |
| 2001/0015301 A1 * | 8/2001 | Kesselring | 181/249 |
| 2002/0121404 A1 * | 9/2002 | Storm | 181/228 |
| 2002/0166719 A1 * | 11/2002 | Dooley | 181/228 |
| 2007/0107982 A1 * | 5/2007 | Sullivan | 181/249 |
| 2007/0158136 A1 * | 7/2007 | Shimomura et al. | 181/251 |
| 2007/0261907 A1 * | 11/2007 | Nishimura et al. | 180/296 |
| 2008/0163613 A1 * | 7/2008 | Mabuchi et al. | 60/299 |

FOREIGN PATENT DOCUMENTS

| | | |
|---|---|---|
| DE | 4216090 A1 * | 11/1993 |
| JP | 62243913 A * | 10/1987 |
| JP | 04121408 A * | 4/1992 |
| JP | 2004-353635 | 12/2004 |

* cited by examiner

EXHAUST DEVICE INCLUDING ELASTICALLY DEFORMABLE ANNULAR MEMBER AND VEHICLE WITH EXHAUST DEVICE

RELATED APPLICATIONS

The present application is based on and claims priority under 35 U.S.C. §119 to Japanese Patent Application No. 2006-127218, filed on May 1, 2006, the entire contents of which is expressly incorporated by reference herein.

BACKGROUND OF THE INVENTION

1. Field of the Invention

The present invention relates an exhaust device and a vehicle provided with the exhaust device. More particularly, the present invention relates to an exhaust device having a support member between overlapping tubular members of the exhaust device, and a vehicle provided with such an exhaust device.

2. Description of the Related Art

Exhaust systems of certain vehicles, and motorcycles and scooter type motorcycles in particular, are often provided with an exhaust device, such as a muffler, including a first tube member and a second tube member having an inner surface that is disposed in alignment with an outer surface of the first tube member. Such an arrangement is disclosed in Japanese Publication No. 2004-353635, for example. Japanese Publication No. 2004-353635 discloses a motorcycle that includes an exhaust device in which an outer surface of one end of an inner tubular member (a first tube member) is fixed to a bracket that is welded to an inner surface of one end of an outer tubular member (a second tube member). In addition, a ring made of stainless mesh is disposed between an outer surface of the other end of the inner tubular member and an inner surface of the other end of the outer tubular member. In this motorcycle exhaust device, the ring made of stainless mesh is fixed to the outer surface of the other end of the inner tubular member by spot welding. As a result of positioning the ring made from stainless mesh between the outer surface of the other end of the inner tubular member and the inner surface of the other end of the outer tubular member in this manner, the outer surface of the other end of the inner tubular member is able to slide with respect to the inner surface of the other end of the outer tubular member via the ring made of stainless mesh when the inner tubular member expands or contracts due to temperature change.

SUMMARY OF THE INVENTION

However, an aspect of the present invention involves the realization by the present inventors that, in such prior art exhaust devices, if heat deformation or the like causes the gap between the outer surface of the other end of the inner tubular member and the inner surface of the other end of the outer tubular member to become narrower, the stainless mesh positioned between the outer surface of the inner tubular member and the inner surface of the outer tubular member is squeezed by the outer surface of the inner tubular member and the inner surface of the outer tubular member such that pressure is applied to the stainless mesh. As a result, the stainless mesh fixed to the outer surface of the inner tubular member is hindered from sliding with respect to the inner surface of the other end of the outer tubular member. Accordingly, if the inner tubular member (the first tube member) expands or contracts due to temperature change, the outer surface of the inner tubular member (the first tube member) is hindered from moving with respect to the inner surface of the outer tubular member (the second tube member).

An aspect of the present invention is to provide an exhaust device that inhibits a hindrance of movement of an outer surface of a first tube member with respect to an inner surface of a second tube member that is disposed in alignment with the outer surface of the first tube member, and a vehicle provided with the exhaust device.

An aspect of a preferred embodiment involves an exhaust device having a first tubular member and a second tubular member. The second tubular member defines an inner surface that faces an outer surface of the first tubular member. An annular member is disposed between the outer surface of the first tubular member and the inner surface of the second tubular member. The annular member has a generally hollow cross section and is elastically deformable in a direction perpendicular to a longitudinal axis of the first tubular member and the second tubular member.

In such an exhaust device, a structure is adopted in which the annular member is disposed between the outer surface of the first tubular member and the inner surface of the second tubular member. Further, the annular member has the generally hollow cross section and is elastically deformable in radial direction of the first tubular member and the second tubular member. As a result, if the gap between the outer surface of the first tubular member and the inner surface of the second tubular member becomes narrower due to heat deformation or the like, the annular member is able to elastically deform in the radial direction of the first tubular member and the second tubular member. Accordingly, friction that is generated when the annular member moves with respect to the outer surface of the first tubular member and the inner surface of the second tubular member can be inhibited from increasing even at a portion in which the gap between the outer surface of the first tubular member and the inner surface of the second tubular member becomes narrower. As a result, it is possible to inhibit hindrance of the movement of the annular member with respect to the outer surface of the first tubular member and the inner surface of the second tubular member, which in turn makes it possible to inhibit hindrance of the movement of the outer surface of the first tubular member with respect to the inner surface of the second tubular member when the first tubular member expands or contracts due to temperature change.

A preferred embodiment involves an exhaust device as described above, wherein the annular member and at least one of the outer surface of the first tubular member and the inner surface of the second tubular member contact one another along substantially only a circumferential line of contact. If this structure is adopted, when the first tubular member expands or contracts while inclined with respect to the second tubular member, the first tubular member can be inclined with respect to the second tubular member centering on the location where there is linear contact between the annular member and at least one of the outer surface of the first tubular member and the inner surface of the second tubular member. In other words, the linear contact line acts as a fulcrum between the annular member and either of the first and second tubular members. Accordingly, the outer surface of the first tubular member can move with respect to the inner surface of the second tubular member while the first tubular member is inclined with respect to the second tubular member.

A preferred embodiment involves an exhaust device as described above, wherein an outer surface of the annular member defines a generally circular shape. With such an arrangement, the annular member can move while rotating with respect to outer surface of the first tubular member and the inner surface of the second tubular member. Accordingly, when the outer surface of the first tubular member moves with respect to the inner surface of the second tubular member, it is possible to inhibit the occurrence of rubbing or sliding when the annular member moves with respect outer surface of the first tubular member and the inner surface of the second tubular member. Therefore, it is possible to inhibit increase in the friction that occurs when the annular member moves with respect to the outer surface of the first tubular member and the inner surface of the second tubular member. Thus, it is possible to inhibit a hindrance of the movement of the outer surface of the first tubular member with respect to the inner surface of the second tubular member.

A preferred embodiment involves an exhaust device as described above, wherein the annular member is formed by shaping a wound coil member into a ring shape. In this case, the wound coil member is a wound coil member constructed of a metal material into an annulus. With such a structure, the annular member can easily be formed to have the generally hollow cross section and be elastically deformable. In addition, the outer surface of the annular member can easily be formed to have a generally circular shape. In addition, the annular member is formed by shaping the coil member, which is formed by winding a metal wire into a coil, into a ring shape or annulus. As a result, when the gap between the outer surface of the first tubular member and the inner surface of the second tubular member becomes narrower, the metal wire that is wound into the coil shape can be further inclined with respect to the radial direction of the first tubular member. This feature also makes it possible to inhibit an increase in friction that would otherwise occur when the annular member moves with respect to the outer surface of the first tubular member and the inner surface of the second tubular member at portions where the gap between the outer surface of the first tubular member and the inner surface of the second tubular member has become narrower.

A preferred embodiment involves an exhaust device as described above, wherein the coil member is an extension coil spring. With such an arrangement, the annular member can be assembled to the outer surface of the first tubular member with the annular member extended to have a predetermined or preferred amount of tension. As a result, the annular member can be assembled to the outer surface of the first tubular member without a gap therebetween.

A preferred embodiment involves an exhaust device as described above, wherein the coil member has a first end and a second end. The external diameter of the second end is smaller than the external diameter of the first end. In addition, the second end is inserted within the hollow cross section of the first end to form the annular coil member. With such an arrangement, the individual coils engage with recesses formed between the coils in each of the first and second ends to secure the second end within the first end. As a result, the second end is inhibited from coming out of the hollow cross section of the first end. Accordingly, the ring shape of the coil member can be maintained.

A preferred embodiment involves an exhaust device as described above, wherein the first end of the coil member has the same external diameter as the external diameter of a section of the coil member located between the first end and the second end. When such a structure is provided, the external diameter of the first end of the coil member is not larger than the external diameter of the section of the coil member located between the first end and the second end, which would otherwise be the case if the second end where of the same or substantially the same diameter as the main body of the annular member. Accordingly, it is only necessary to provide a region between the outer surface of the first tubular member and the inner surface of the second tubular member that is sufficient to accommodate the first end and main body of the annular member, which have the same external diameter, and thus when the coil member is assembled to the outer surface of the first tubular member it is not necessary to carry out the assembly while making sure that the one end of the coil member having the large external diameter is positioned in the above described region. Thus, the assembly operation that is carried out to assemble the coil member onto the outer surface of the first tubular member is easier to perform.

A preferred embodiment involves an exhaust device as described above, further including a movement regulating member for regulating the movement of the annular member defined by at least one of the first tubular member and the second tubular member. The movement regulating member inhibits the annular member from moving beyond the movement regulating member in a direction along the longitudinal axis of the first tubular member and the second tubular member.

A preferred embodiment involves an exhaust device as described above, wherein the movement regulating member comprises a protrusion that is formed integrally in at least one of the outer surface of the first tubular member and the inner surface of the second tubular member. A height of the protrusion is less than the height of the annular member in the radial direction of the first tubular member and the second tubular member. With such an arrangement, the movement regulating member can easily be provided in the inner surface of the first tubular member or the outer surface of the second tubular member. Furthermore, because the height of the protrusion is smaller than the height of the annular member in the radial direction of the first tubular member and the second tubular member, it is possible to inhibit the protrusion provided in the outer surface of the first tubular member or the inner surface of the second tubular member from coming into contact with the inner surface of the second tubular member or the outer surface of the first tubular member. As a result, it is possible to inhibit the hindrance of movement of the outer surface of the first tubular member with respect to the inner surface of the second tubular member when the first tubular member expands or contracts due to temperature change.

A preferred embodiment involves an exhaust device as described above, wherein the movement regulating member includes a first movement regulating member that is positioned to one side of the annular member in the axial direction of the first tubular member and the second tubular member, and a second movement regulating member that is positioned to the other side of the annular member. With such an arrangement, it is possible to inhibit the annular member from moving beyond the first and second movement regulating members thereby retaining the annular member between the first and second movement regulating members.

A preferred embodiment involves a vehicle incorporating an exhaust device as described in any of the paragraphs above. As a result of adopting such an exhaust device, the vehicle is able to obtain one or more of the advantages of the exhaust device described above.

BRIEF DESCRIPTION OF THE DRAWINGS

These and other features, aspects and advantages of the present invention are described below with reference to drawings of preferred embodiments, which are intended to illustrate and not to limit the present invention. The drawings contain fourteen (14) figures.

FIG. 7 is a partial cross sectional view of the rearward portion of the muffler shown in FIG. 6, wherein the inner tubular member is expanded in length due to heat expansion or the like.

DETAILED DESCRIPTION OF THE PREFERRED EMBODIMENTS

Figure 1:
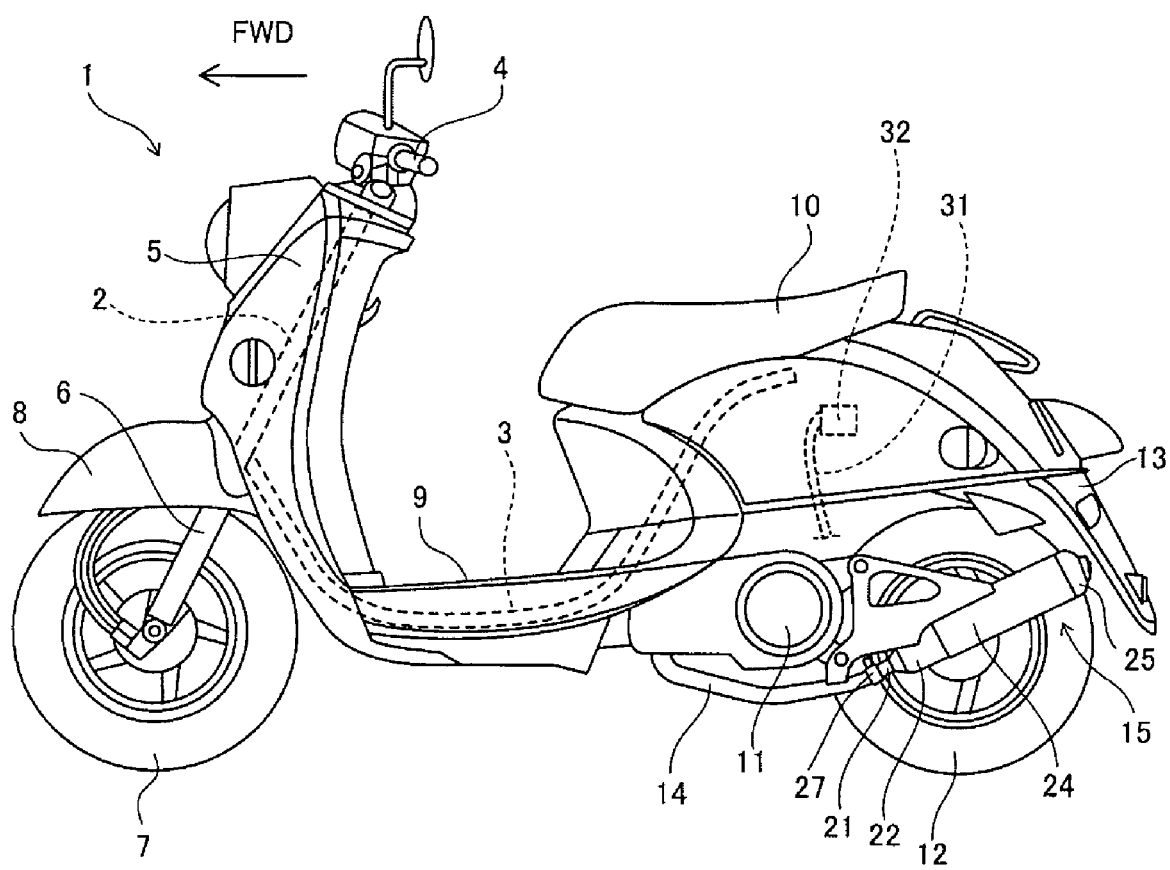
FIG. 1 is a side view a motorcycle incorporating an exhaust device having certain features, aspects and advantages of the invention.

FIG. 1 illustrates a motorcycle having certain features, aspects and advantages of one or more preferred embodiments of the present invention. FIG. 2 to FIG. 12 illustrate the structure of a muffler of the motorcycle of FIG. 1. The present embodiment describes a scooter-type motorcycle as one example of a vehicle of the invention; however, other types of vehicles are contemplated as well. In the figures, FWD indicates the forward direction in the traveling direction of the motorcycle.

The motorcycle 1 includes a main frame 3 that is fixed to a lower side of a head pipe 2 as shown in FIG. 1. The main frame 3 is formed to extend in a rearward direction from the lower side of the head pipe 2. The head pipe 2 and the main frame 3 at least partially define a body frame of the vehicle.

In addition, a handlebar 4 is attached to an upper section of the head pipe 2 such that the handlebar 4 can be rotated. Moreover, a front cowl 5 is provided forward of the head pipe 2 so as to cover the front side of the head pipe 2. Furthermore, a front fork 6 includes suspension to absorb impacts and is disposed beneath the head pipe 2. A front wheel 7 is rotatably attached to lower end of the front fork 6. In addition, a front fender 8 is disposed above the front wheel 7.

A foot rest 9 is disposed on the upper side of a central section of the main frame 3. Furthermore, a seat 10 is disposed on the upper side of a rear section of the main frame 3. An engine unit including an engine 11 is disposed beneath the rear section of the main frame 3. In addition, a rear wheel 12 is rotatably supported by a rearward end of the engine unit. A rear fender 13 is attached above the rear wheel 12 so as to cover above the rear wheel 12.

The motorcycle 1 includes an exhaust system that receives exhaust gases from the engine 11 and delivers the exhaust gases to an external environment. The exhaust system generally includes an exhaust pipe and a muffler. The exhaust pipe defines an exhaust conduit that receives the exhaust gases from the engine 11 and delivers the exhaust gases to the muffler, which preferably reduces the noise associated with the flow of exhaust gases and releases the exhaust gases to the external environment. The exhaust pipe and/or the muffler may be made up of one or more individual components. The muffler is generally referred to herein as an exhaust device; however, the term exhaust device could apply to any portion of the exhaust system, including the exhaust pipe, expansion chamber or the like. Preferably, as described below, a downstream end portion of the exhaust pipe is located within a space defined by the muffler. As described above, a first or forward end of the exhaust pipe 14 is connected to the engine 11. The exhaust pipe 14 extends toward the rear of the motorcycle 1 and is connected to the muffler 15.

Figure 2:
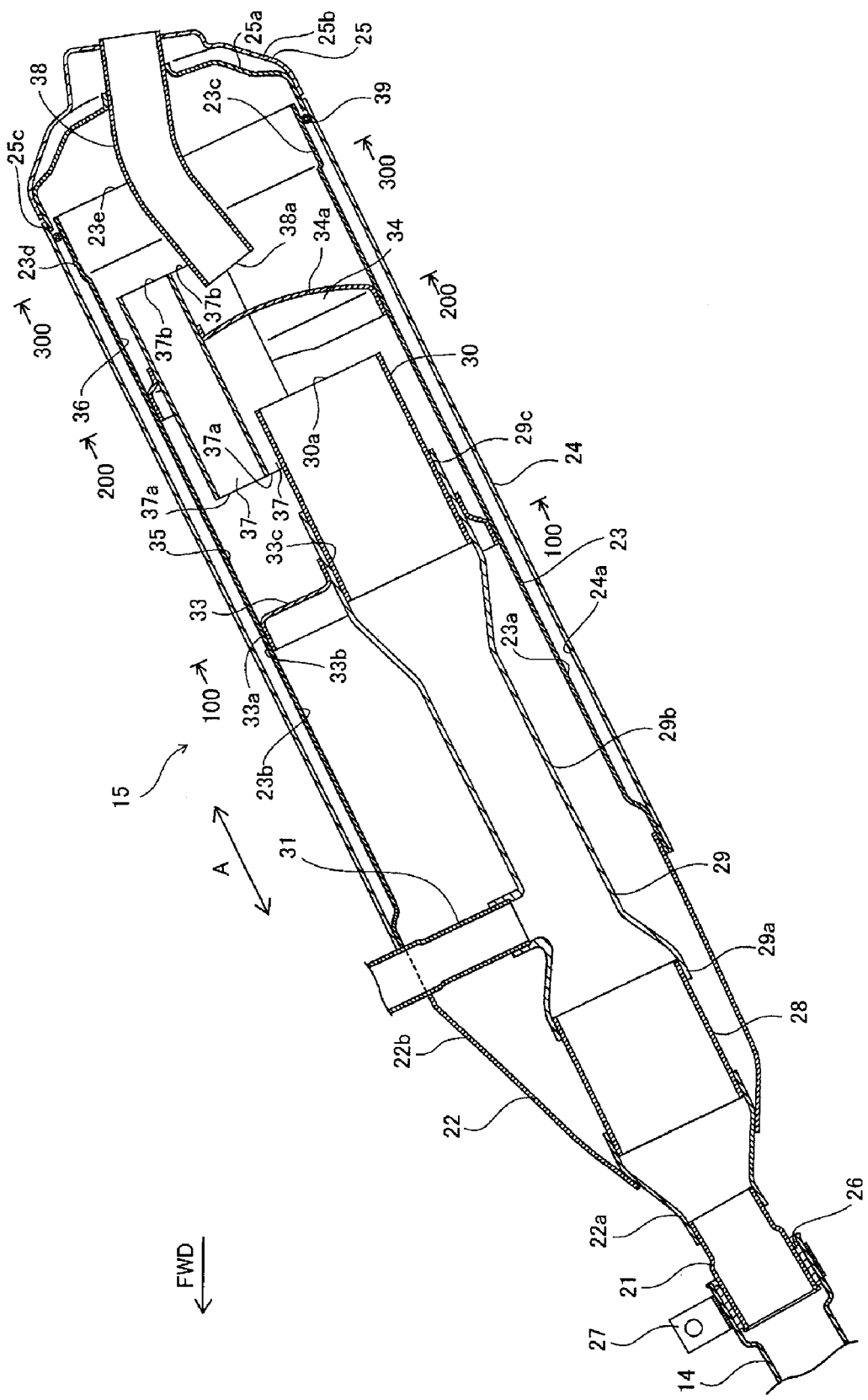
FIG. 2 is a cross sectional view of a muffler of the motorcycle of FIG. 1.

The muffler 15, as illustrated in FIG. 2, includes a connecting pipe 21 that is connected to the exhaust pipe 14, a forward cap member 22 that is made of stainless steel or another suitable material and that is connected to a rear section of the connecting pipe 21. An inner tubular member 23 is made of stainless steel or another suitable material and is connected to a rear section of the forward cap member 22. An outer tubular member 24, which is secured (e.g., welded) to the inner tubular member 23 at the rear section of the forward cap member 22 and is made of stainless steel or another suitable material. The outer tubular member 24 includes an inner surface 24a that extends along an outer surface 23a of the inner tubular member 23 such that at least portions of the surfaces 23a, 24a overlap one another. A rearward cap member 25 that is made of stainless steel or another suitable material is secured (e.g., welded) to a rear section of the outer tubular member 24. More specifically, in the illustrated arrangement, a front section of the inner tubular member 23 is fixed to the forward cap member 22 and the outer tubular member 24, while the rear section of the inner tubular member 23 is not fixed to the outer tubular member 24. Note that, the inner tubular member 23 is one example of a "first tubular member" of the preferred embodiments, and the outer tubular member 24 is one example of a "second tubular member" of the preferred embodiments.

The connecting pipe 21 is connected to the exhaust pipe 14 by a fixing member 27 with a seal 26 interposed therebetween. In addition, the forward cap member 22 includes a front member 22a connected to the rear section of the connecting pipe 21, and a forward cap body member 22b that is fixed to the front member 22a. In addition, a purification tube member 28 formed by a catalyst is attached to a rear end section of the front member 22a. Furthermore, an air flow pipe 29 having a large diameter section 29a, a smaller diameter section 29b, and a large diameter section 29c is connected to the rear section of the purification tube member 28. In addition, a purification tube member 30 formed from a catalyst is connected to the rear section of the large diameter section 29c of the air flow pipe 29. The purification tube member 28, the air flow pipe 29 and the purification tube member 30 configure a "purifier". The purifier functions to oxidize HC (hydrocarbon) and CO (carbon monoxide) that remain after combustion of the fuel into $H_2O$ (water) and $CO_2$ (carbon dioxide), and reduce $NO_X$ (nitrogen oxides).

In addition, one end of a secondary air induction pipe 31 for introducing secondary air is connected to the small diameter section 29b of the air flow pipe 29. The secondary air induction pipe 31 is provided to make sure that ample oxygen (air) is supplied to the purification tube member 30, taking into consideration the fact that a reduced level of oxygen is supplied to the downstream purification tube member 30 as a result of oxygen being consumed in the purification tube member 28 as a result of oxidation that occurs in the purification tube member 28. The secondary air induction pipe 31 is formed to extend to the outside of the muffler 15 via the connection section of the forward cap member 22, the inner tubular member 23 and the outer tubular member 24. Moreover, as illustrated in FIG. 1, a reed valve housing member 32 that houses a reed valve (or other suitable type of check valve), not shown, is attached to the other end of the secondary air induction pipe 31.

Furthermore, as illustrated in FIG. 2, a support member 33 that supports the air flow pipe 29 is attached to the large diameter section 29c of the air flow pipe 29. The support member 33 includes a short tubular member 33a that extends a short distance in the axial direction (direction A) of the inner tubular member 23. An outer surface 33b of this short tubular member 33a is moveably positioned in line with the inner surface 23b of the inner tubular member 23. In addition, when the purifier reaches a high temperature, a rear section (the large diameter section 29c of the air flow pipe 29) of the purifier moves rearward in direction A and along with this the rear section of the inner tubular member 23 moves rearward in direction A. Under such conditions, the outer surface 33b of the short tubular member 33a of the support member 33 typically moves slightly along the inner surface 23b of the inner tubular member 23.

Figure 3:
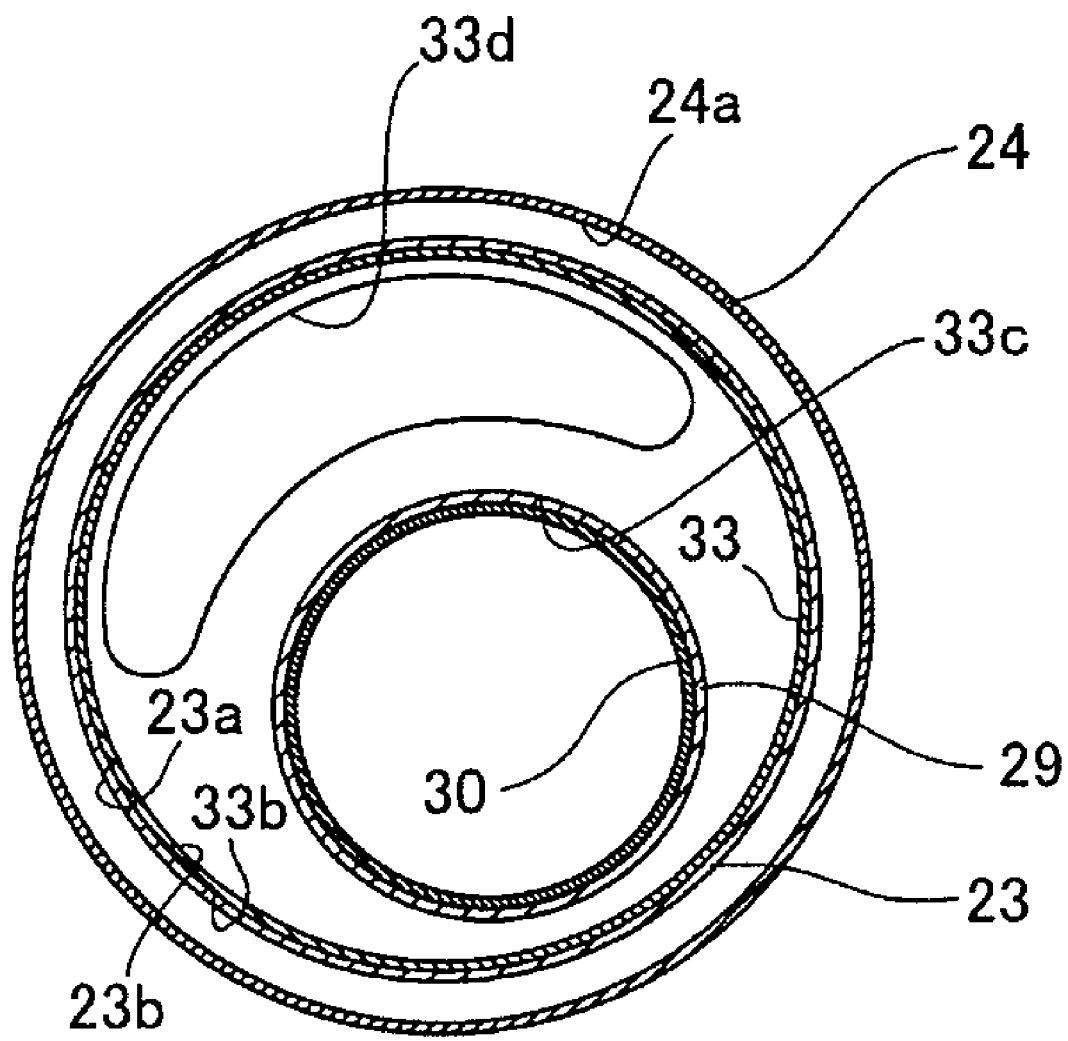
FIG. 3 is a cross sectional view of the muffler taken along line 100-100 of FIG. 2.

Furthermore, as shown in FIG. 3, an opening 33d and an insertion hole 33c in which the air flow pipe 29 is inserted are formed in the support member 33. More specifically, a space that is located forward of the support member 33 of the inner tubular member 23 and a space that is located rearward of the support member 33 are connected via the opening 33d.

Moreover, as illustrated in FIG. 2, a partition 34 that is fixed to the inner surface 23b of the inner tubular member 23 is disposed to the rear of the purification tube member 30. Furthermore, the forward cap member 22, the inner tubular member 23 and the partition 34 at least partially define a first expansion chamber 35. In addition, the partition 34, the inner tubular member 23 and the rearward cap member 25 at least partially define a second expansion chamber 36.

A wall 34a formed as a spherical surface is provided in the partition 34. Forming the wall 34a with a spherical surface shape makes it possible to increase the strength of the wall 34a. As a result, even if high pressure exhaust gas that has passed through the purification tube member 30 (the purifier) and into the first expansion chamber 35 expands and generates a large sound, the wall 34a is able to inhibit vibration. As a result, the sound generated by expansion of the exhaust gas is inhibited from being fully transmitted to the second expansion chamber 36.

Figure 4:
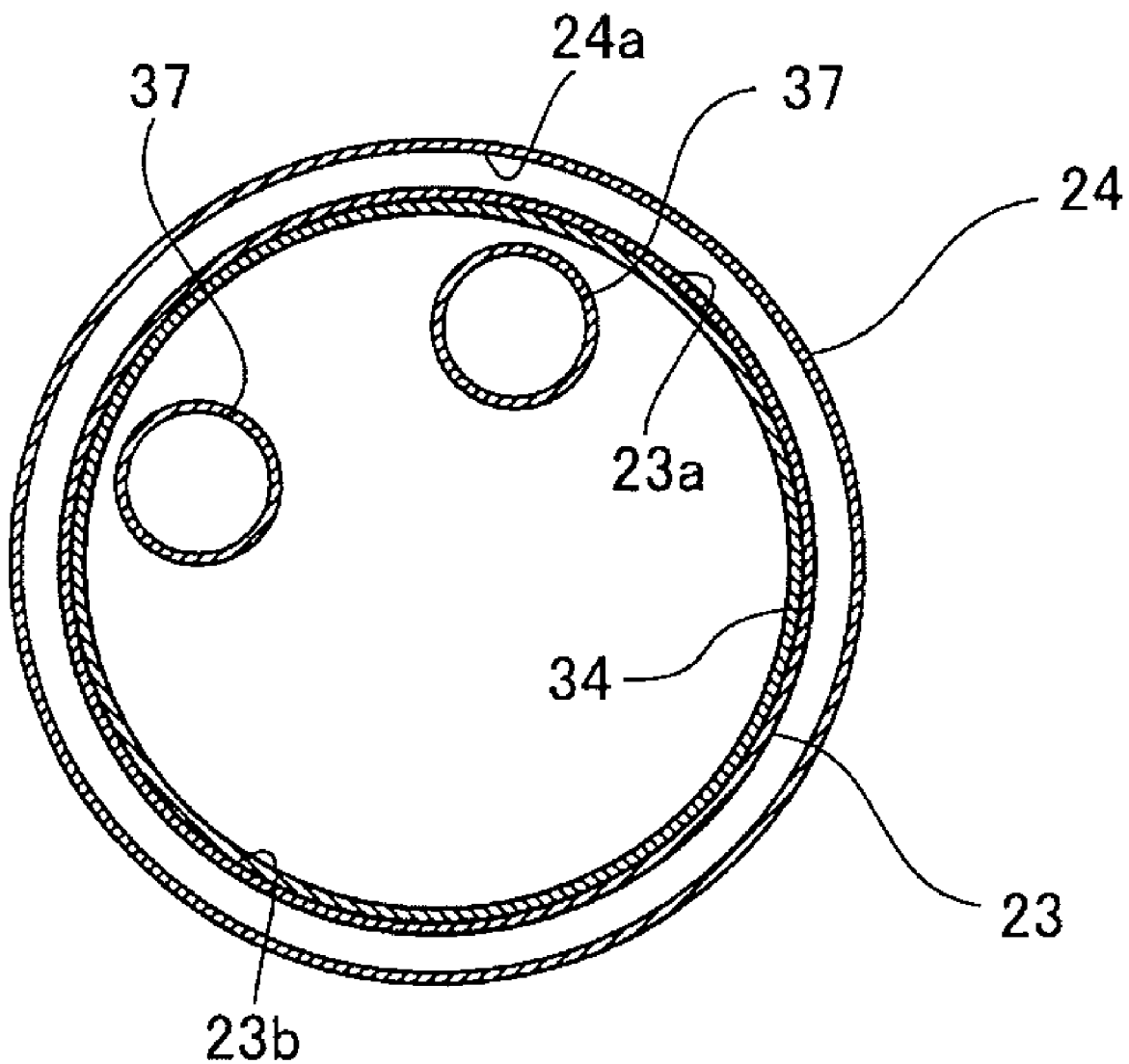
FIG. 4 is a cross sectional view of the muffler taken along line 200-200 of FIG. 2.

In addition, as shown in FIG. 2 and FIG. 4, two connection pipes 37 extend through the partition 34. The connection pipes 37, as shown in FIG. 2, function to allow exhaust gas to pass from the first expansion chamber 35 to the second expansion chamber 36. Furthermore, a forward opening surface 37a of the connection pipes 37 is disposed further forward in the axial direction (direction A) of the inner tubular member 23 than a rearward opening surface 30a of the purification tube member 30. As a result, the noise generated when exhaust gas that has passed through the purification tube member 30 expands is inhibited from directly entering into the connection pipes 37, whereby the sounds generated by expansion of the exhaust gas is inhibited from being fully transmitted to the second expansion chamber 36.

Furthermore, a discharge pipe 38 for exhausting exhaust gas that passes through the connection pipes 37 to the outside of the muffler 15 is provided in the rearward cap member 25. A forward opening surface 38a of the discharge pipe 38 is disposed further forward in the axial direction (direction A) of the inner tubular member 23 than the rearward opening surface 37b of the connection pipes 37. As a result, the noise generated by expansion of exhaust gas that has passed through the connection pipes 37 is inhibited from directly entering into the discharge pipe 38.

In addition, the discharge pipe 38 is secured (e.g., welded) to a support member 25a of the rearward cap member 25. Further, a rearward cap body member 25b, which the support member 25a can be attached to, is included in the rearward cap member 25. Moreover, as shown in FIG. 6, a rear end section of the outer tubular member 24 and the rearward cap body member 25b are welded and fixed to the support member 25a of the rearward cap member 25, respectively.

In the illustrated arrangement, the outer surface 23a of the inner tubular member 23 and the inner surface 24a of the outer tubular member 24 have cross sectional shapes that are generally circular. However, in other arrangements, other shapes may be used. An annular, or ring shaped member 39 is made of stainless steel or another suitable material and is positioned between the outer surface 23a of the inner tubular member 23 and the inner surface 24a of the outer tubular member 24. More specifically, the ring shaped member 39, as shown in FIG. 2 and FIG. 6, is positioned around the outer surface 23a of a rear end section 23c of the inner tubular member 23. The rear end section 23c is processed such that it is generally circular when viewed from the axial direction (direction A) of the inner tubular member 23. As a result, it is possible to prevent the distance between the outer surface 23a of the inner tubular member 23 and the inner surface 24a of the outer tubular member 24 being different in different areas of the members 23, 24. In one arrangement, the inner tubular member 23 is formed into a tubular shape by welding opposing edges of a thin plate or sheet that has been bent into a tube shape. Accordingly, when viewed from the axial direction (direction A) of the inner tubular member 23 when the thin plate has been bent into the tube shape and welded, the inner tubular member 23 is not formed into a generally perfectly circular shape. However, after welding has been carried out, the outer surface 23a of the inner tubular member 23 is processed such that it has a generally circular shape and, preferably, nearly a perfectly circular shape.

Figure 5:
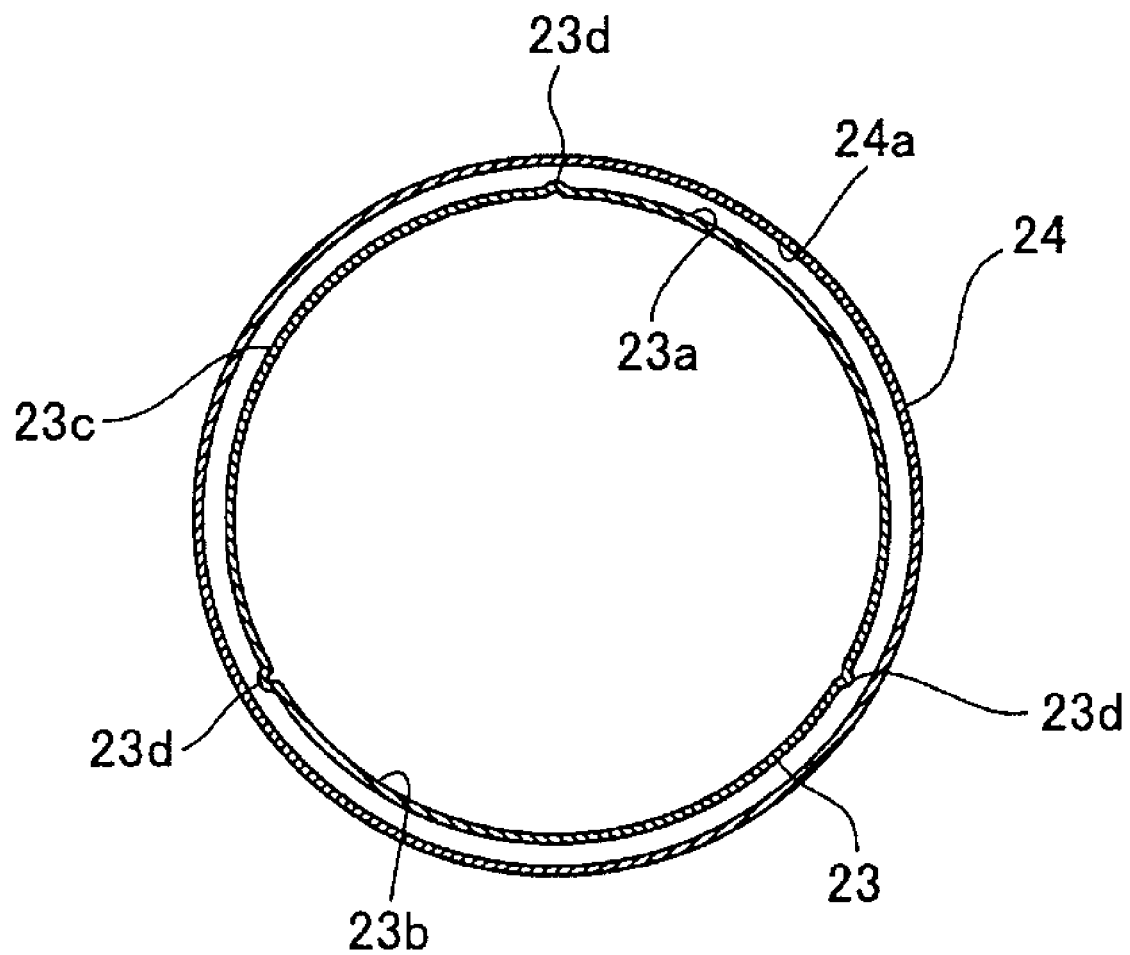
FIG. 5 is a cross sectional view of the muffler taken along line 300-300 of FIG. 2.
Figure 6:
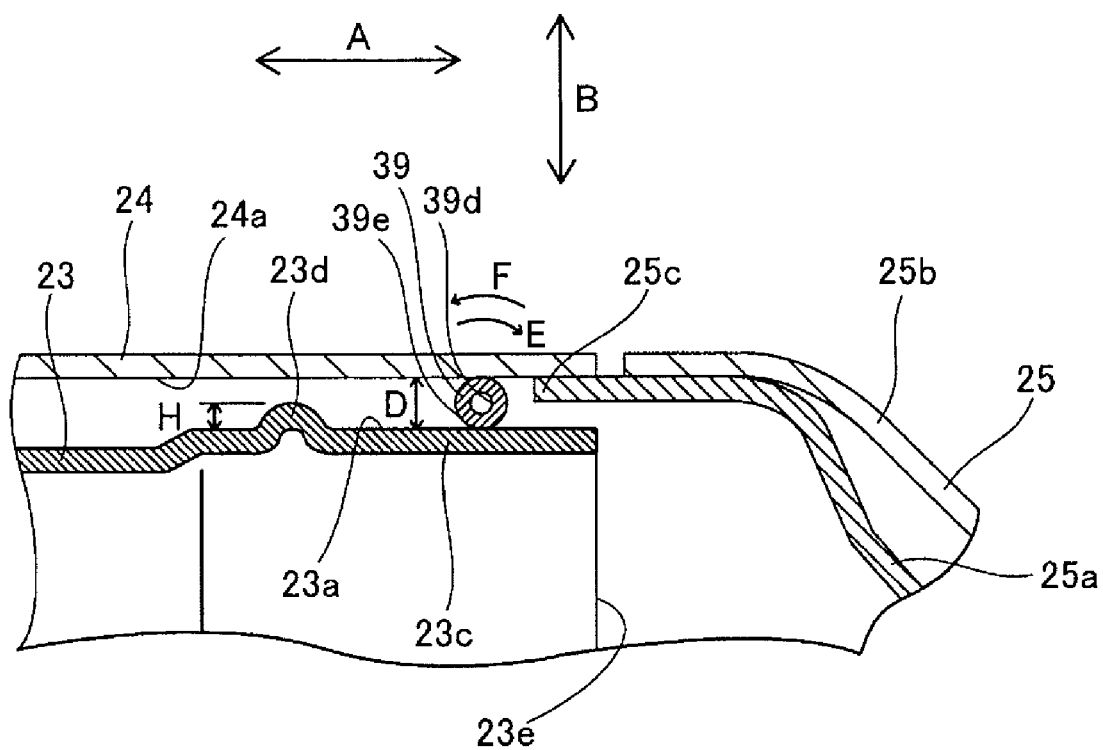
FIG. 6 is a partial cross sectional view of a rearward portion of the muffler, showing a ring shaped or annular member positioned between an inner tubular member and an outer tubular member of the muffler.

Furthermore, in this arrangement, as shown in FIG. 5 and FIG. 6, one or more, and preferably three, protrusions 23d having a protrusion height H (refer to FIG. 6) that is smaller than an outer diameter D (refer to FIG. 6) of the ring shaped member 39 are formed in a section of the outer surface 23a of the rear end section 23c at positions that are further forward in the axial direction of the inner tubular member 23 and the outer tubular member 24 (direction A in FIG. 6) than the position of the ring shaped member 39. The protrusions 23d are formed in an integrated manner at 120 degrees of separation from each other. As a result, the ring shaped member 39 is inhibited from moving further forward than the protrusions 23*d* of the inner tubular member 23. Note that, the protrusions 23*d* are one example of a "movement regulating member." Furthermore, the protrusions 23*d* of the rear end section 23*c* may be formed at the same time as carry out the processing to make the rear end section 23*c* generally perfectly circular. Accordingly, it is not necessary to carry out a separate process to form the protrusions 23*d*.

Figure 7:
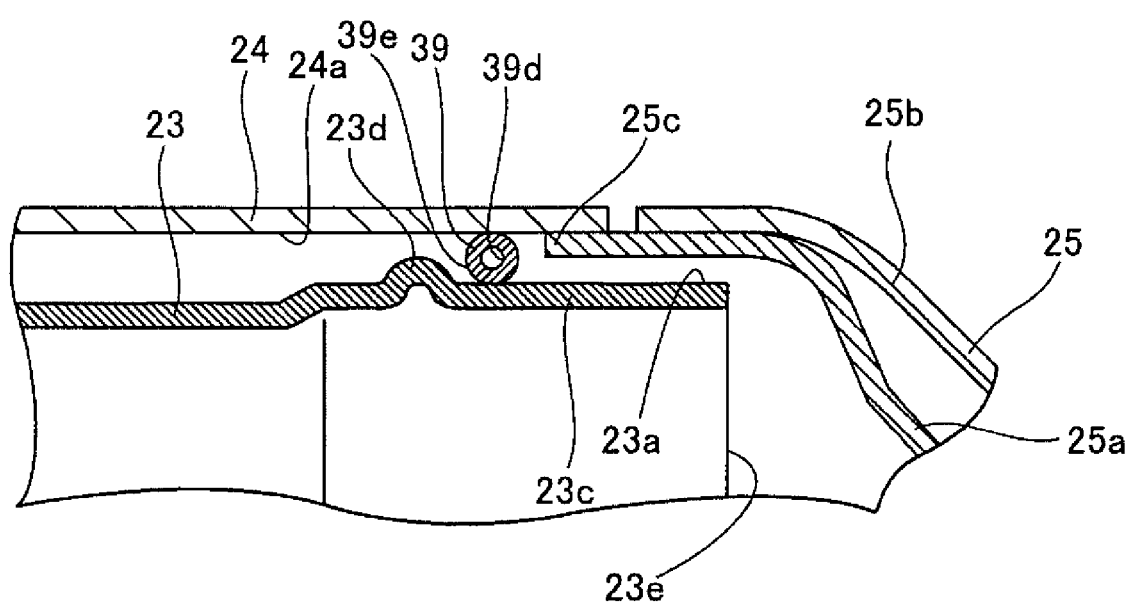

In addition, as shown in FIG. 6, a front end section 25*c* of the rearward cap member 25 is positioned rearward of the ring shaped member 39 in the axial direction (direction A) of the inner tubular member 23 and the outer tubular member 24, and at a location that is further forward than a rearward opening surface 23*e* of the inner tubular member 23. As a result, it is possible to inhibit the ring shaped member 39 from moving further to the rear than the front end section 25*c* of the rearward cap member 25, whereby it is possible to inhibit the ring shaped member 39 from being displaced from a rearward end of the outer surface 23*a* of the rear end section 23*c* of the inner tubular member 23. The front end section 25*c* is one example of a "movement regulation member." Furthermore, as shown in FIG. 7, the front end section 25*c* of the rearward cap member 25 is located at a predetermined distance away from the protrusions 23*d* of the inner tubular member 23 such that, even if the rear end section 23*c* of the inner tubular member 23 has moved to the rearward cap member 25 side (rearward) as a result of the inner tubular member 23 expanding at high temperatures, the ring shaped member 39 can be adequately accommodated between the protrusions 23*d* of the inner tubular member 23.

Figure 8:
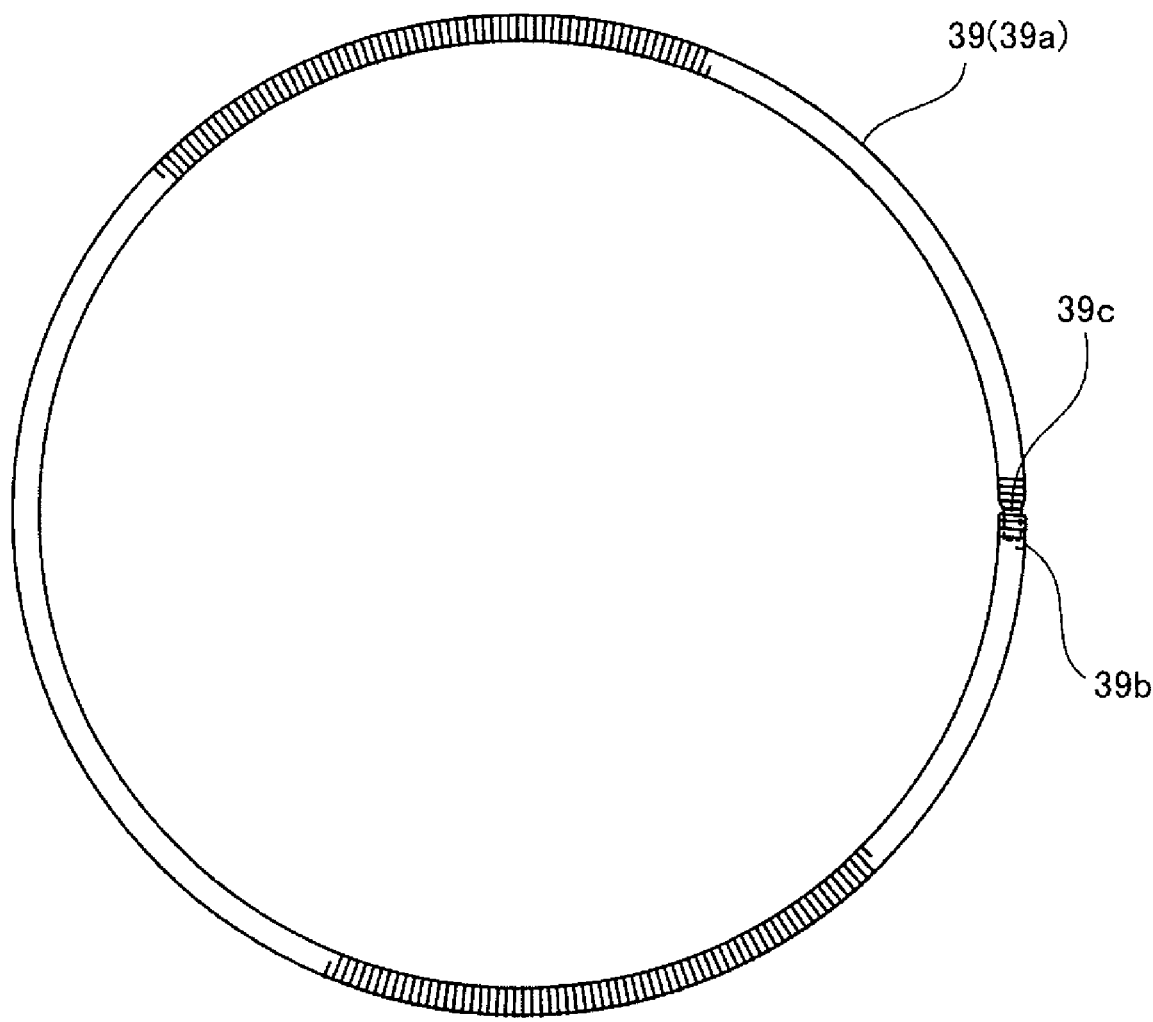
FIG. 8 is a front view of ring shaped or annular member separate from the muffler.
Figure 9:
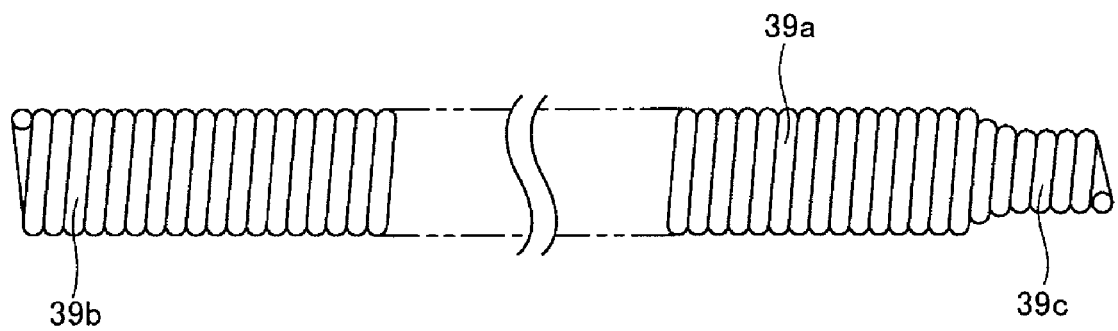
FIG. 9 is a plan view of a portion of the annular member, illustrating the coiled construction of the annular member.
Figure 10:
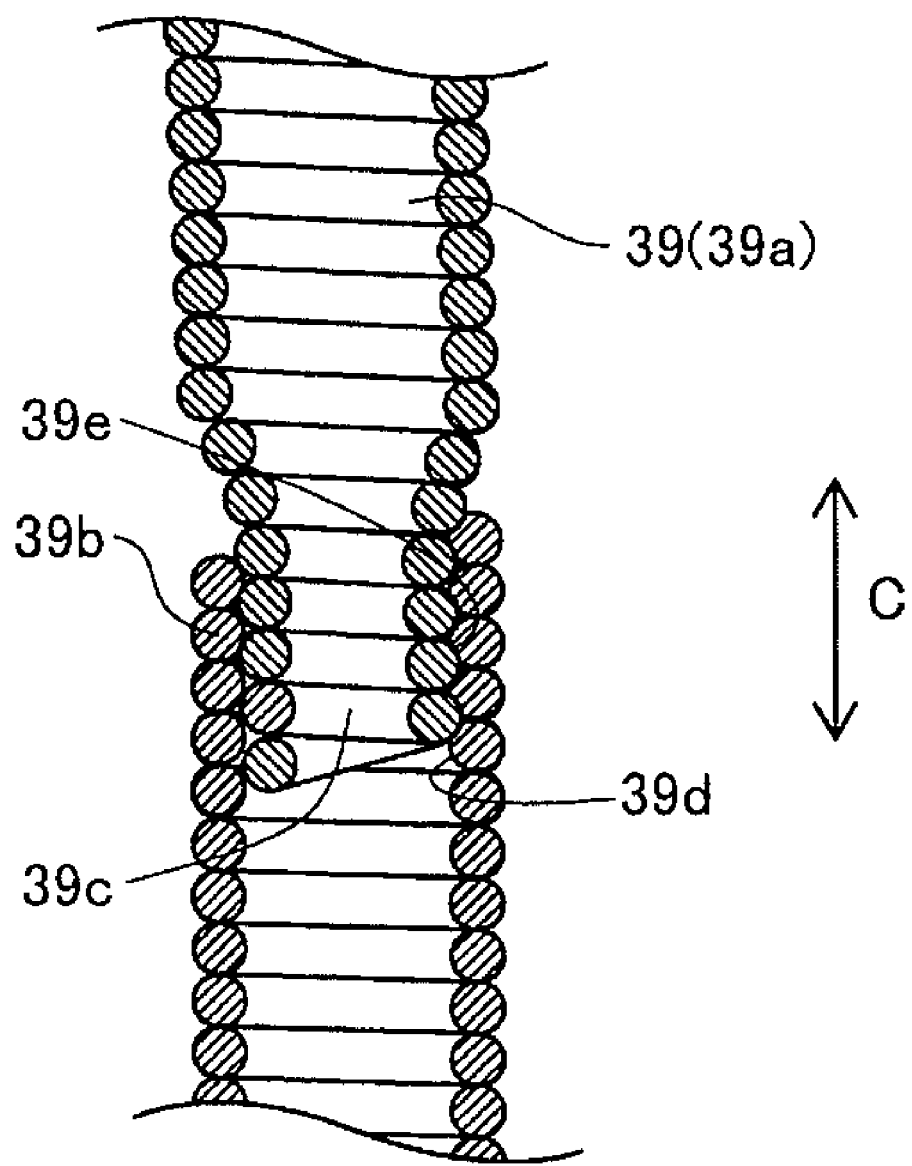
FIG. 10 is a cross sectional view of an assembly of a second end of the annular member to a first end of the annular member.
Figure 11:
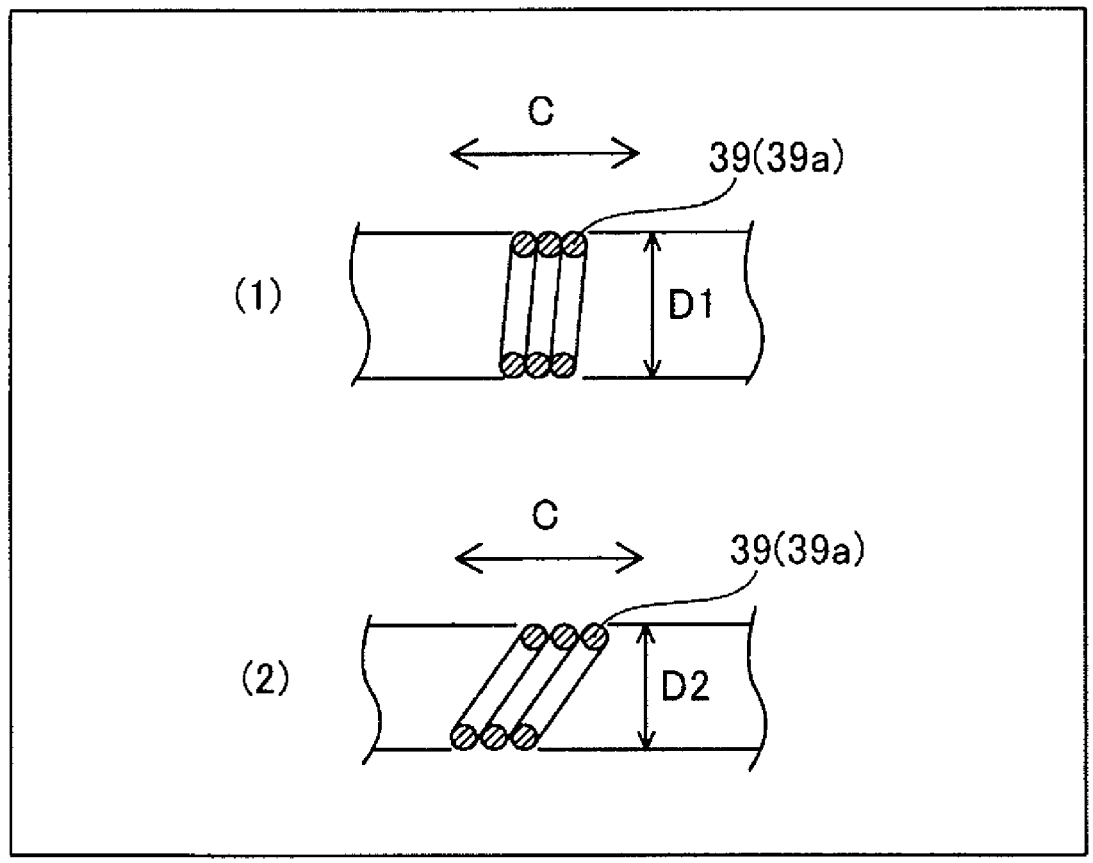
FIG. 11 is a cross sectional view of the annular member in two states. In a first state, the coils of the annular member are inclined at a first angle with respect to an axis of the coils and in the second state, the coils are inclined at a second angle to reduce a height of the annular member.

In the illustrated arrangement, the ring shaped member 39, as shown in FIG. 8, is formed by shaping a coil member 39*a* (refer to FIG. 9) into a ring shape, or annulus. The coil member 39*a* is made from an extension coil spring formed by winding a metal wire having a diameter of around 0.5 mm into a coil shape having a diameter of around 3 mm. More specifically, the coil member 39*a*, as shown in FIG. 9 and FIG. 10, includes a first end 39*b* and a second end 39*c* and has a cross section that is substantially hollow. As a result of forming the ring shaped member 39 (the coil member 39*a*) to have a hollow cross section in this manner, the ring shaped member 39 can be elastically deformed in the radial direction (direction B in FIG. 6) of the inner tubular member 23 and the outer tubular member 24 between the outer surface 23*a* of the inner tubular member 23 (refer to FIG. 6) and the inner surface 24*a* of the outer tubular member 24 (refer to FIG. 6). Moreover, in the illustrated arrangement, by forming the ring shaped member 39 from the coil member 39*a*, if the distance D between the outer surface 23*a* of the inner tubular member 23 and the inner surface 24*a* of the outer tubular member 24 becomes smaller from D1 (e.g., about 3 mm) (state (1) in FIG. 11) to D2 (e.g., about 2 mm to about 2.8 mm) (state (2) in FIG. 11), the coil member 39*a* can be further inclined in the extension direction (direction C) of the coil member 39*a* from state (1) shown in FIG. 11 to state (2) shown in FIG. 11.

Furthermore, as shown in FIG. 9, the first end 39*b* of the coil member 39*a* has an external diameter that is the same as the external diameter of a section of the coil member 39*a* located between the first end 39*b* and the second end 39*c* thereof. The second end 39*c* of the coil member 39*a* has an external diameter that is smaller than the first end 39*b*. More specifically, the coil member 39*a* is an extension coil spring that has substantially the same external diameter in which just one end (the second end 39*c*) has been formed with a smaller external diameter. Furthermore, the second end 39*c* of the coil member 39*a* has an external diameter that is the same as, or slightly larger than, the internal diameter of the first end 39*b*.

Furthermore, as shown in FIG. 10, the second end 39*c* of the coil member 39*a* is fitted to an inner periphery section 39*d* of the hollow cross section of the first end 39*b*, whereby the coil member 39*a* is formed into the ring shaped member 39 that has the ring shape. In addition, the protruding external surface of metal coils that form an outer surface 39*e* of the hollow cross section of the second end 39*c* engages with recesses between neighboring metal coils of the inner surface 39*d* of the hollow cross section of the first end 39*b* when the second end 39*c* is fitted within the hollow cross section of the first end 39*b*. As a result, the second end 39*c* is inhibited from coming out of the first end 39*b*. As a result, the ring shape of the coil member 39*a* can be maintained.

In the illustrated arrangement, as shown in FIG. 8, the ring shaped member 39 has a generally circular shape, and preferably approximately a perfectly circular shape, when the second end 39*c* of the coil member 39*a* is fitted within the first end 39*b*.

Figure 12:
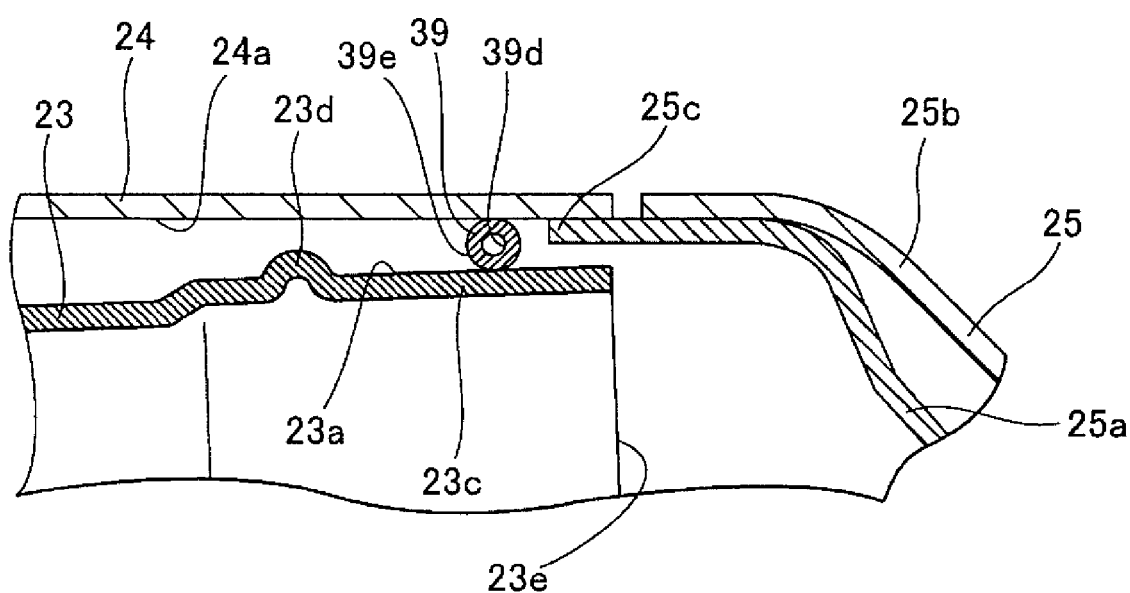
FIG. 12 is a cross sectional view of the portion of the muffler shown in FIG. 6, wherein the inner tubular member is oriented in a non-coaxial manner with respect to the outer tubular member.

Moreover, as shown in FIG. 6, the outer surface 39*e* of the substantially hollow cross section of the ring shaped member 39 is substantially a ring shape, so that the ring shaped member 39 can move while rotating in direction E or direction F with respect to the outer surface 23*a* of the inner tubular member 23 and the inner surface 24*a* of the outer tubular member 24. In addition, the ring shaped member 39, the outer surface 23*a* of the inner tubular member 23 and the inner surface 24*a* of the outer tubular member 24 are substantially in linear contact along a contact line in the circumferential direction of the outer surface 23*a* of the inner tubular member 23 and the inner surface 24*a* of the outer tubular member 24. As a result, as shown in FIG. 12, when the inner tubular member 23 expands or contracts due to temperature change while being inclined with respect to the outer tubular member 24, the inner tubular member 23 can incline with respect to the outer tubular member 24 centering on the section where there is linear contact between the ring shaped member 39, the outer surface 23*a* of the inner tubular member 23 and the inner surface 24*a* of the outer tubular member 24. Accordingly, the outer surface 23*a* of the inner tubular member 23 can move with respect to the inner surface 24*a* of the outer tubular member 24 while the inner tubular member 23 is inclined with respect to the outer tubular member 24.

Furthermore, the coil member 39*a* (the ring shaped member 39), as shown in FIG. 10, is formed such that there is generally no space between each of the metal coils. As a result, the number of support points of the ring shaped member 39 that support the outer surface 23*a* of the inner tubular member 23 and the inner surface 24*a* of the outer tubular member 24 can be increased. However, in other arrangements or applications, it may be desirable to provide spaces between the coils.

In the illustrated arrangement, as described above, the ring shaped member 39 is provided between the outer surface 23*a* of the inner tubular member 23 and the inner surface 24*a* of the outer tubular member 24, and the ring shaped member 39 has a substantially hollow cross section. In addition, the ring shaped member 39 is able to elastically deform in the radial direction of the inner tubular member 23 and the outer tubular member 24 between the outer surface 23*a* of the inner tubular member 23 and the inner surface 24*a* of the outer tubular member 24. As a result, if the distance between the outer surface 23*a* of the inner tubular member 23 and the inner surface 24*a* of the outer tubular member 24 becomes smaller due to heat deformation or the like, the ring shaped member 39 is able to elastically deform in the radial direction of the inner tubular member 23 and the outer tubular member 24, or a direction perpendicular to the axes of the tubular members 23, 24 (direction B). Accordingly, friction that is generated when the ring shaped member 39 moves with respect to the outer surface 23a of the inner tubular member 23 and the inner surface 24a of the outer tubular member 24 can be inhibited from increasing even at portions where the distance between the outer surface 23a of the inner tubular member 23 and the inner surface 24a of the outer tubular member 24 becomes smaller. As a result, it is possible to inhibit the hindrance of movement of the ring shaped member 39 with respect to the outer surface 23a of the inner tubular member 23 and the inner surface 24a of the outer tubular member 24, which in turn makes it possible to inhibit hindrance of the movement of the outer surface 23a of the inner tubular member 23 with respect to the inner surface 24a of the outer tubular member 24 when the inner tubular member 23 expands or contracts due to temperature change.

Furthermore, in the illustrated arrangement, the outer surface 39e of the ring shaped member 39 is formed to be generally ring shaped, whereby the ring shaped member 39 can move while rotating about the axis of the metal coils with respect to the outer surface 23a of the inner tubular member 23 and the inner surface 24a of the outer tubular member 24. As a result, when the outer surface 23a of the inner tubular member 23 moves with respect to the inner surface 24a of the outer tubular member 24, it is possible to inhibit the occurrence of rubbing or sliding when the ring shaped member 39 moves with respect to the outer surface 23a of the inner tubular member 23 and the inner surface 24a of the outer tubular member 24. Accordingly, it is possible to inhibit increase in the friction that occurs when the ring shaped member 39 moves with respect to the outer surface 23a of the inner tubular member 23 and the inner surface 24a of the outer tubular member 24. Thus, it is possible to inhibit hindrance of the movement of the outer surface 23a of the inner tubular member 23 with respect to the inner surface 24a of the outer tubular member 24.

In addition, in the illustrated arrangement, the ring shaped member 39 is formed by shaping the coil member 39a, which is formed by winding a metal wire in a coil, into a ring shape. As a result, when the distance between the outer surface 23a of the inner tubular member 23 and the inner surface 24a of the outer tubular member 24 becomes smaller, the metal wire that is wound into the coil shape can be further inclined with respect to the radial direction of the inner tubular member 23. This feature also makes it possible to inhibit an increase in friction that occurs when the ring shaped member 39 moves with respect to the outer surface 23a of the inner tubular member 23 and the inner surface 24a of the outer tubular member 24 at portions where the distance between the outer surface 23a of the inner tubular member 23 and the inner surface 24a of the outer tubular member 24 has become smaller.

Furthermore, in the illustrated arrangement, because the coil member 39a is formed using an extension coil spring, the ring shaped member 39 can be attached to the outer surface 23a of the inner tubular member 23 with the ring shaped member 39 extended to have a tension within a predetermined tension range. As a result, the ring shaped member 39 can be attached to the outer surface 23a of the inner tubular member 23 without a gap therebetween.

Moreover, in the illustrated arrangement, the first end 39b of the coil member 39a is formed to have the same external diameter as the section of the coil member 39a located between the first end 39b and the second end 39c, and the second end 39c of the coil member 39a is formed to have an external diameter that is smaller than the first end 39b. As a result, the external diameter of the first end 39b of the coil member 39a is not made to be larger than the external diameter of the section of the coil member 39a located between the first end 39b and the second end 39c thereof. Accordingly, it is only necessary to provide a region between the outer surface 23a of the inner tubular member 23 and the inner surface 24a of the outer tubular member 24 that is sufficient to accommodate the size of the first end 39b, and thus when the coil member 39a is attached to the outer surface 23a of the inner tubular member 23, it is not necessary to carry out attachment while making sure that the first end 39b of the coil member 39a having the large external diameter is positioned in the above-described region. Thus, the attachment operation that is carried out to attach the coil member 39a with respect to the outer surface 23a of the inner tubular member 23 is easier to perform.

In addition, in the illustrated arrangement, because the protrusion height H of the protrusions 23d of the inner tubular member 23 is smaller than the outer diameter D of the ring shaped member 39 (the coil member 39a), it is possible to inhibit the protrusions 23d of the inner tubular member 23 from coming into contact with the inner surface 24a of the outer tubular member 24. As a result, it is possible to inhibit the hindrance of movement of the outer surface 23a of the inner tubular member 23 with respect to the inner surface 24a of the outer tubular member 24 when the inner tubular member 23 expands or contracts due to temperature change.

In the arrangements illustrated herein, all of the described features are exemplary, and thus are not intended to limit the invention. The scope of the invention is defined by the claims and not by the description of the above-described embodiment. In addition, the invention includes structures that are equivalent to the scope of the claims and all modifications that come within the scope of the claims.

For example, in the above-described embodiment, a motorcycle is described as one example of a vehicle provided with the exhaust device (e.g., a muffler). However, the invention is not limited to this, and so long as a vehicle is provided with the exhaust device, the invention may be applied to other vehicles such as an automobile, a three-wheel vehicle, an ATV (All Terrain Vehicle) or the like.

Furthermore, the above-described embodiments provide examples in which the ring shaped member is formed by a coil member formed by an extension coil spring. However, the invention is not limited to this structure, and the ring shaped member may be formed by a member other than a coil member. In addition, the coil member may be formed by coils other than an extension coil spring.

In addition, the above-described embodiments provide an example in which the exhaust device is applied to a vehicle. However, the invention is not limited to this, and the exhaust device may be applied to devices other than those used in a vehicle.

Figure 13:
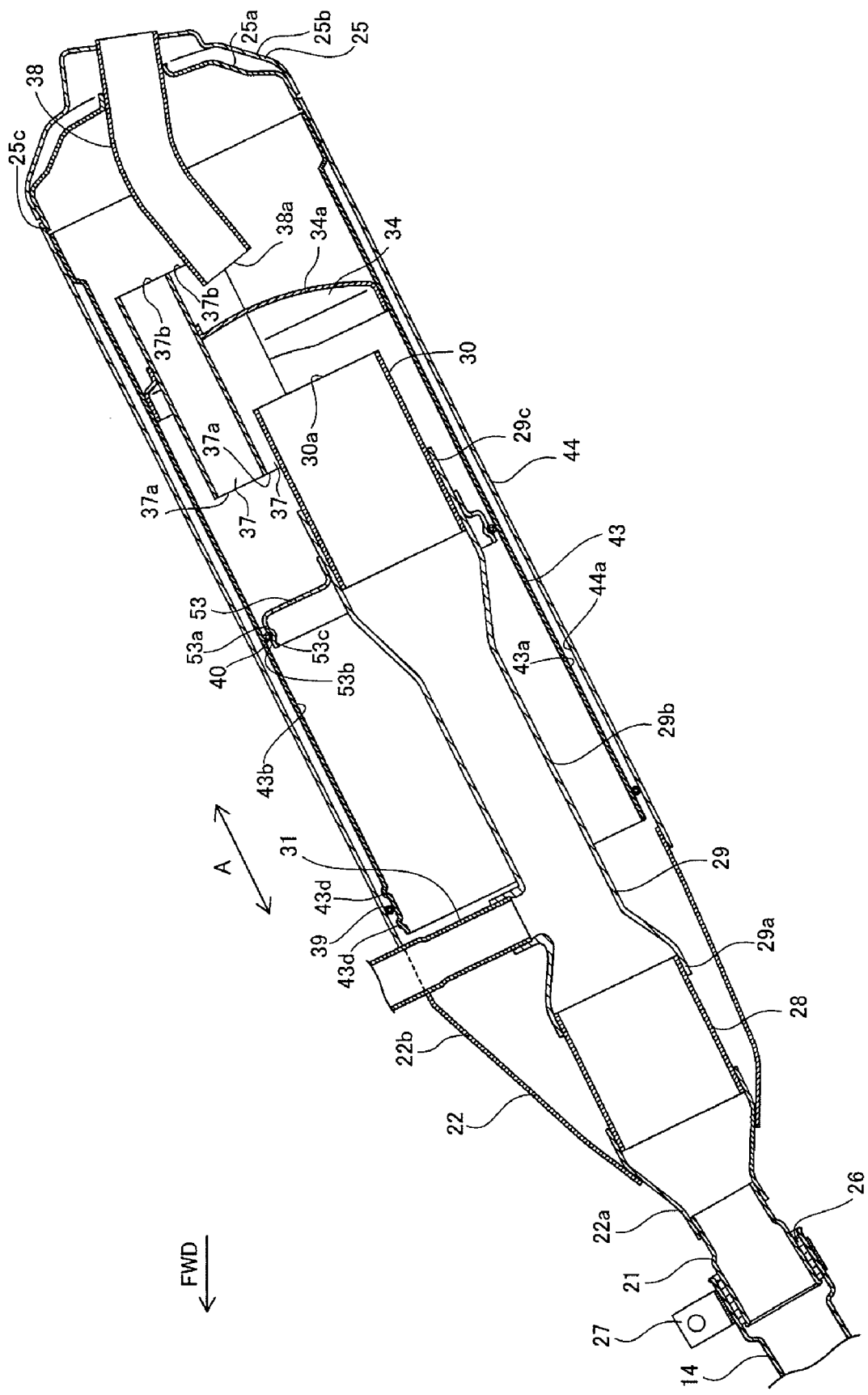
FIG. 13 is a cross sectional view of a modification of the muffler of FIGS. 1-12, wherein the annular member between the inner tubular member and the outer tubular member is positioned nearer to a forward or upstream end of the muffler. Further, a second annular member is provided between a support for the exhaust pipe and the inner tubular member.
Figure 14:
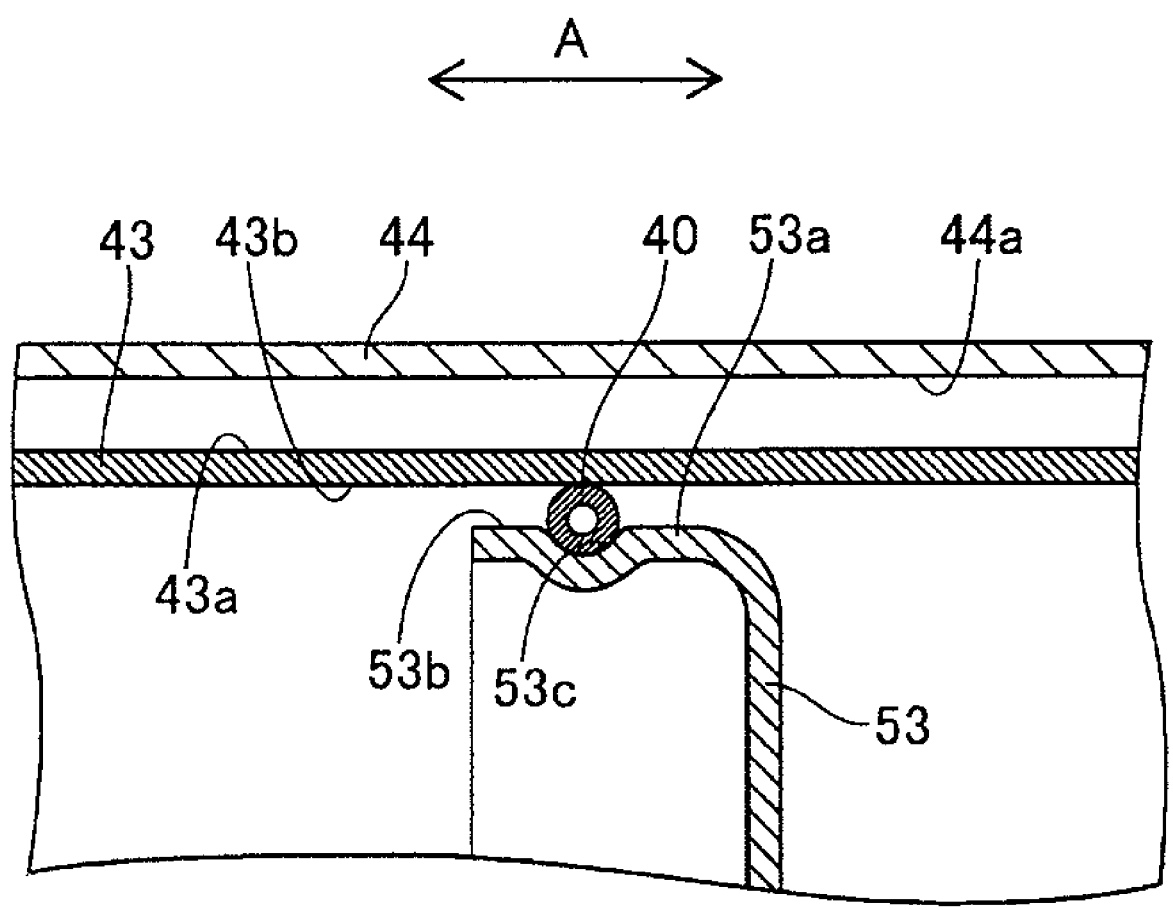
FIG. 14 is a cross sectional view of the additional annular member of FIG. 13.

In addition, in the above-described arrangement, the front section of the inner tubular member is fixed to the outer tubular member. However, the invention is not limited to this structure, and a muffler the same or similar to the modified form of the muffler shown in FIG. 13 and FIG. 14 may be adopted in which a rear section of an inner tubular member 43 is fixed to an outer tubular member 44. In this case, the ring shaped member 39 may be disposed between an outer surface 43a of a front section of the inner tubular member 43 and an inner surface 44a of a front section of the outer tubular member 44. In addition, protrusions 43d may be formed integrally at sections of the outer surface 43a of the inner tubular member 43 that are to the front and the rear of the ring shaped member 39 in direction A. In addition, in this structure, when the purifier and the inner tubular member 43 reach a high temperature, the rear section of the purifier (the large diameter section 29c of the air flow pipe 29) moves to the rear in direction A as in the above-described embodiment, and the front section and a central section of the inner tubular member 43 move to front in direction A, whereby a movement amount of an outer surface 53b of a short tubular member 53a of a support member 53 with respect to the inner surface 43b of the inner tubular member 43 becomes larger. If a ring shaped member 40 is positioned between the outer surface 53b of the short tubular member 53a of the support member 53 and the inner surface 43b of the inner tubular member 43 as shown in FIG. 14, when the purifier and the inner tubular member 43 expand or contract due to temperature change, the outer surface 53b of the short tubular member 53a of the support member 53 is able to move smoothly with respect to the inner surface 43b of the inner tubular member 43. Under such conditions, in order to inhibit the ring shaped member 40 from moving more than a desired amount in direction A with respect to the outer surface 53b of the short tubular member 53a of the support member 53, a modified form may be adopted in which, as shown in FIG. 13 and FIG. 14, a recess 53c is provided in the circumferential direction of the short tubular member 53a of the support member 53 in the outer surface 53b of the short tubular member 53a of the support member 53, or protrusions like those explained in the above-described embodiment may be provided. Note that, a "first tubular member" and a "second tubular member" are intended to include a tube member having a relatively short length in the axial direction, such as the short tubular member 53a.

Furthermore, the above-described arrangements provide an example in which the protrusions (the movement regulation members) are provided on the outer surface of the inner tubular member. However, the invention is not limited to this structure, and the protrusions may be provided on the inner surface of the outer tubular member.

Further, the above-described arrangements provide an example in which three protrusions (the movement regulation members) are provided on the outer surface of the inner tubular member. However, the invention is not limited to this structure, and a single protrusion may be provided on the outer surface of the inner tubular member, or two, or four or more protrusions may be provided.

Moreover, the above-described arrangements provide an example in which the ring shaped member is formed by shaping a coil member, which is formed by coiling a metal wire into a coiled extension coil spring, into a ring shape. However, the invention is not limited to this structure, and the ring shaped member may be formed by shaping a heat resistant rubber tube into a ring shape.

In addition, the above-described examples include the ring shaped member, which is formed into a generally circular shape when one end of the coil member is fitted into the inner hollow space of the other end of the coil member. In the example, this ring shaped member is disposed between the outer surface of the inner tubular member and the inner surface of the outer tubular member that respectively have cross sections that are generally circular. However, the invention is not limited to this structure, and the ring shaped member, which is formed into a generally circular shape when the other end of the coil member is fitted into the inner periphery section of the one end of the coil member that has the hollow cross section, may be disposed between the outer surface of an inner tubular member and the inner surface of an outer tubular member that respectively have a generally oval shaped cross section. Alternatively, a ring shaped member, which is formed into a generally oval shape when one end of the coil member is fitted into the other end of the coil member, may be disposed between the outer surface of the inner tubular member and the inner surface of the outer tubular member that respectively have a generally oval shaped cross section. Further, other non-circular or non-oval shapes may also be used for either or both of the tubular members and annular or ring shaped member.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. An exhaust device for a vehicle, comprising:
    a first tubular member;
    a second tubular member, wherein an inner surface of the second tubular member faces an outer surface of the first tubular member;
    an annular member positioned between the outer surface of the first tubular member and the inner surface of the second tubular member, wherein the annular member includes a generally hollow cross section and is elastically deformable in a direction perpendicular to a longitudinal axis of the first tubular member and the second tubular member, and wherein the annular member is rotatable about a central axis of the cross section such that the annular member can move by rotation relative to the outer surface of the first tubular member and the inner surface of the second tubular member; and
    at least one movement regulating member arranged to regulate movement of the annular member, the at least one movement regulating member defining a boundary of a range within which the annular member can move by rotation in a direction along the longitudinal axis of the first tubular member and the second tubular member; wherein
    the at least one movement regulating member is defined by a deformation in one of the outer surface of the first tubular member and the inner surface of the second tubular member.

2. The exhaust device of claim 1, wherein the annular member and at least one of the outer surface of the first tubular member and the inner surface of the second tubular member contact one another along substantially only a circumferential line of contact.

3. The exhaust device of claim 1, wherein an outer surface of the annular member defines a generally circular cross-sectional shape.

4. The exhaust device of claim 3, wherein the annular member is a wound coil member constructed of a metal material formed into an annulus.

5. The exhaust device of claim 4, wherein the wound coil member is an extension coil spring.

6. The exhaust device of claim 4, wherein the coil member includes a first end and a second end, wherein an external diameter of the second end is smaller than an external diameter of the first end, wherein the second end is inserted within the hollow cross section of the first end to define the annular member.

7. The exhaust device of claim 6, wherein the external diameter of the first end of the coil member is substantially equal to an external diameter of a section of the coil member located between the first end and the second end.

8. The exhaust device of claim 1, wherein the range within which the annular member can move is a length equal to or greater than a length of an outer circumference of the annular member.

9. The exhaust device of claim 1, wherein the deformation includes a protrusion that is integrally formed in at least one of the outer surface of the first tubular member and the inner surface of the second tubular member, and a height of the protrusion is less than a height of the annular member in the direction perpendicular to the longitudinal axis of the first tubular member and the second tubular member.

10. The exhaust device of claim 1, wherein the at least one movement regulating member comprises a first movement regulating member that is positioned on a first side of the annular member in a direction along the longitudinal axis of the first tubular member and the second tubular member, and a second regulating member that is positioned on a second side of the annular member opposite the first side.

11. A vehicle, comprising:
an engine;
an exhaust device comprising an exhaust pipe and a muffler, the muffler comprising:
a first tubular member;
a second tubular member, wherein an inner surface of the second tubular member faces an outer surface of the first tubular member;
an annular member positioned between the outer surface of the first tubular member and the inner surface of the second tubular member, wherein the annular member includes a generally hollow cross section and is elastically deformable in a direction perpendicular to a longitudinal axis of the first tubular member and the second tubular member, and wherein the annular member is rotatable about a central axis of the cross section such that the annular member can move by rotation relative to the outer surface of the first tubular member and the inner surface of the second tubular member; and
at least one movement regulating member arranged to regulate movement of the annular member, the at least one movement regulating member defining a boundary of a range within which the annular member can move by rotation in a direction along the longitudinal axis of the first tubular member and the second tubular member; wherein
the at least one movement regulating member is defined by a deformation in one of the outer surface of the first tubular member and the inner surface of the second tubular member.

12. The vehicle of claim 11, wherein the annular member and at least one of the outer surface of the first tubular member and the inner surface of the second tubular member contact one another along substantially only a circumferential line of contact.

13. The vehicle of claim 11, wherein an outer surface of the annular member defines a generally circular cross-sectional shape.

14. The vehicle of claim 13, wherein the annular member is a wound coil member constructed of a metal material formed into an annulus.

15. The vehicle of claim 14, wherein the wound coil member is an extension coil spring.

16. The vehicle of claim 14, wherein the coil member includes a first end and a second end, wherein an external diameter of the second end is smaller than an external diameter of the first end, wherein the second end is inserted within the hollow cross section of the first end to define the annular member.

17. The vehicle of claim 16, wherein the external diameter of the first end of the coil member is substantially equal to an external diameter of a section of the coil member located between the first end and the second end.

18. The vehicle of claim 11, wherein the range within which the annular member can move is a length equal to or greater than a length of an outer circumference of the annular member.

19. The vehicle of claim 11, wherein the deformation includes a protrusion that is integrally formed in at least one of the outer surface of the first tubular member and the inner surface of the second tubular member, and a height of the protrusion is less than a height of the annular member in the direction perpendicular to the longitudinal axis of the first tubular member and the second tubular member.

20. The vehicle of claim 11, wherein the at least one movement regulating member comprises a first movement regulating member that is positioned on a first side of the annular member in a direction along the longitudinal axis of the first tubular member and the second tubular member, and a second regulating member that is positioned on a second side of the annular member opposite the first side.

* * * * *